US010215546B2

(12) United States Patent
Anderson et al.

(10) Patent No.: US 10,215,546 B2
(45) Date of Patent: Feb. 26, 2019

(54) ROTOR PROFILE COMPARATOR

(71) Applicant: Roper Pump Company, Commerce, GA (US)

(72) Inventors: Tyson Bentley Anderson, Watkinsville, GA (US); Loyd Dache Smith, Cornelia, GA (US); Zachariah Paul Rivard, Nicholson, GA (US); Edmond Tate Coghlan, Talmo, GA (US)

(73) Assignee: Roper Pump Company, Commerce, GA (US)

( * ) Notice: Subject to any disclaimer, the term of this patent is extended or adjusted under 35 U.S.C. 154(b) by 88 days.

(21) Appl. No.: 15/601,212

(22) Filed: May 22, 2017

(65) Prior Publication Data

US 2018/0100730 A1    Apr. 12, 2018

Related U.S. Application Data

(60) Provisional application No. 62/404,911, filed on Oct. 6, 2016.

(51) Int. Cl.
*G01B 3/14* (2006.01)
(52) U.S. Cl.
CPC ...................... *G01B 3/14* (2013.01)
(58) Field of Classification Search
CPC .............. G01B 3/14; G01B 5/20; G01B 5/28
USPC ......................................................... 33/546
See application file for complete search history.

(56) References Cited

U.S. PATENT DOCUMENTS

| | | | |
|---|---|---|---|
| 1,792,936 A | 2/1931 | Skarl | |
| 1,954,852 A | 4/1934 | Thomson | |
| 2,780,005 A * | 2/1957 | Finney | G01B 5/205 |
| | | | 33/199 R |
| 3,284,913 A | 11/1966 | Satava | |
| 4,213,247 A | 7/1980 | Romine | |
| 4,479,306 A | 10/1984 | Klementich | |
| 4,517,745 A | 5/1985 | Flare | |
| 4,641,410 A | 2/1987 | Plaquin et al. | |
| 4,934,059 A | 6/1990 | Green | |
| 4,939,845 A | 7/1990 | Porter | |
| 4,965,937 A | 10/1990 | Hill | |
| 5,253,422 A | 10/1993 | Zaveruha | |
| 6,612,042 B1 | 9/2003 | McKinney et al. | |
| 7,299,555 B2 | 11/2007 | Muradov et al. | |
| 7,356,938 B2 | 4/2008 | Brueckert et al. | |
| 7,536,795 B2 | 5/2009 | Glimpel et al. | |

(Continued)

*Primary Examiner* — Yaritza Guadalupe
(74) *Attorney, Agent, or Firm* — Snyder, Clark, Lesch & Chung, LLP

(57) ABSTRACT

A comparator tool is provided for evaluating the profile of a multi-lobe helical rotor. The comparator tool includes a housing with a first end and a second end and an internal bore extending from the first end to the second end. The internal bore includes a first diameter having nominal clearance for an original equipment manufacturer (OEM)-specified major diameter of the rotor, a second diameter having nominal clearance for an OEM-specified minor diameter of the rotor, and multiple helical grooves corresponding to a number of lobes in the helical rotor. Each of the multiple helical grooves has nominal clearance for an OEM-specified tip diameter of the rotor. The comparator tool slides along the length of the rotor and provides visibility of an interface between a circumference of the rotor and the first end at any place along a length of the rotor.

20 Claims, 10 Drawing Sheets

(56) References Cited

U.S. PATENT DOCUMENTS

| | | |
|---|---|---|
| 7,918,031 B2 | 4/2011 | Wu |
| 8,544,179 B2 | 10/2013 | Moreau et al. |
| 9,032,632 B2 | 5/2015 | Durivault et al. |
| 2017/0254327 A1* | 9/2017 | Kreidl .................. F04C 2/1071 |
| 2018/0100730 A1* | 4/2018 | Anderson ................ G01B 3/14 |

* cited by examiner

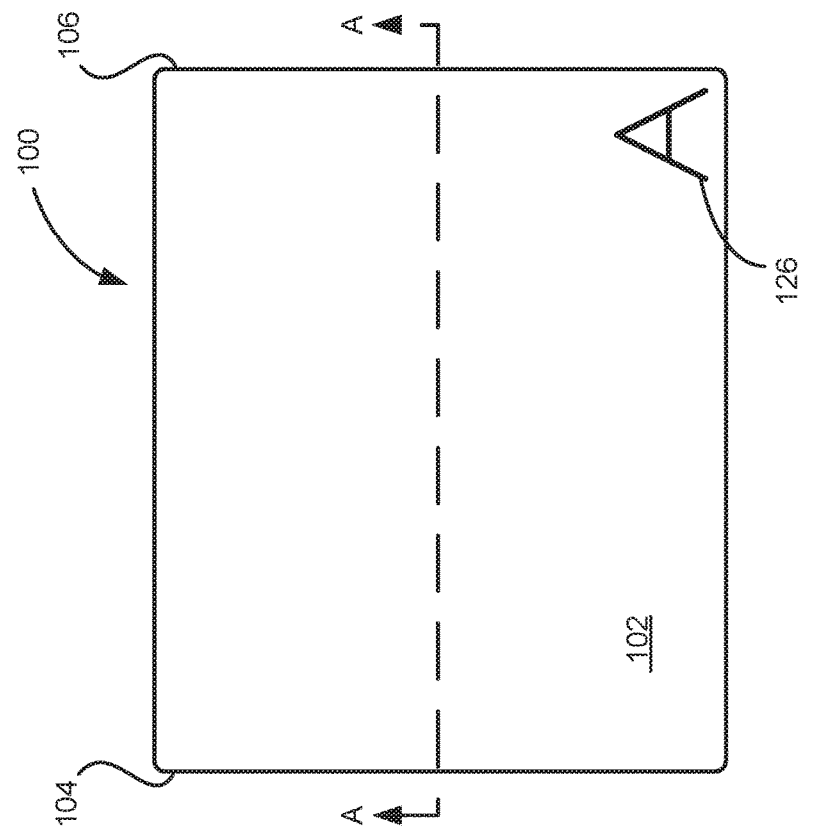
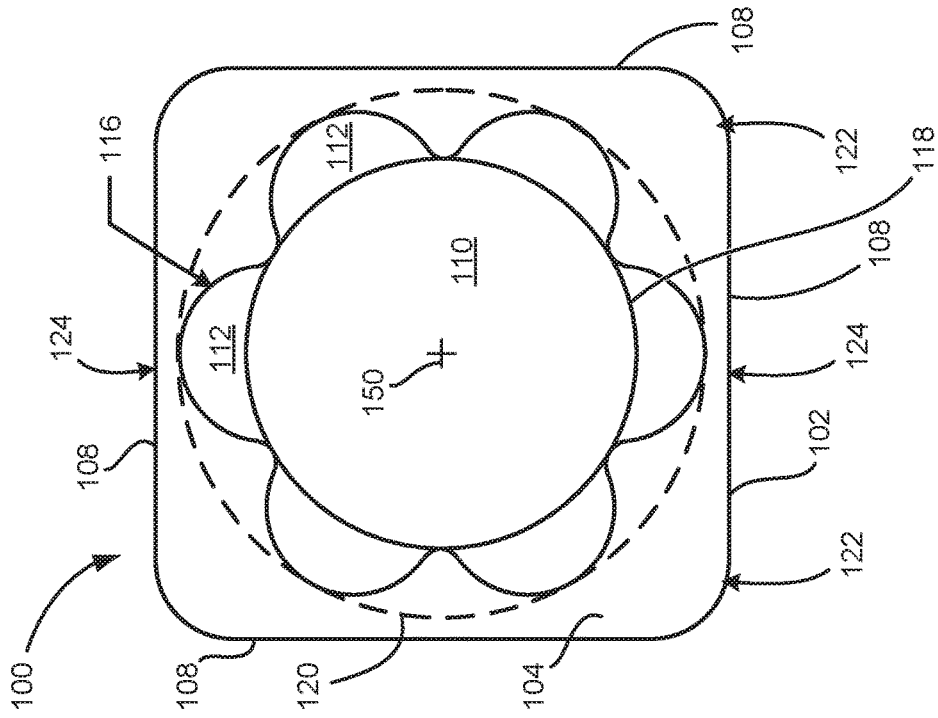
FIG. 5
FIG. 4

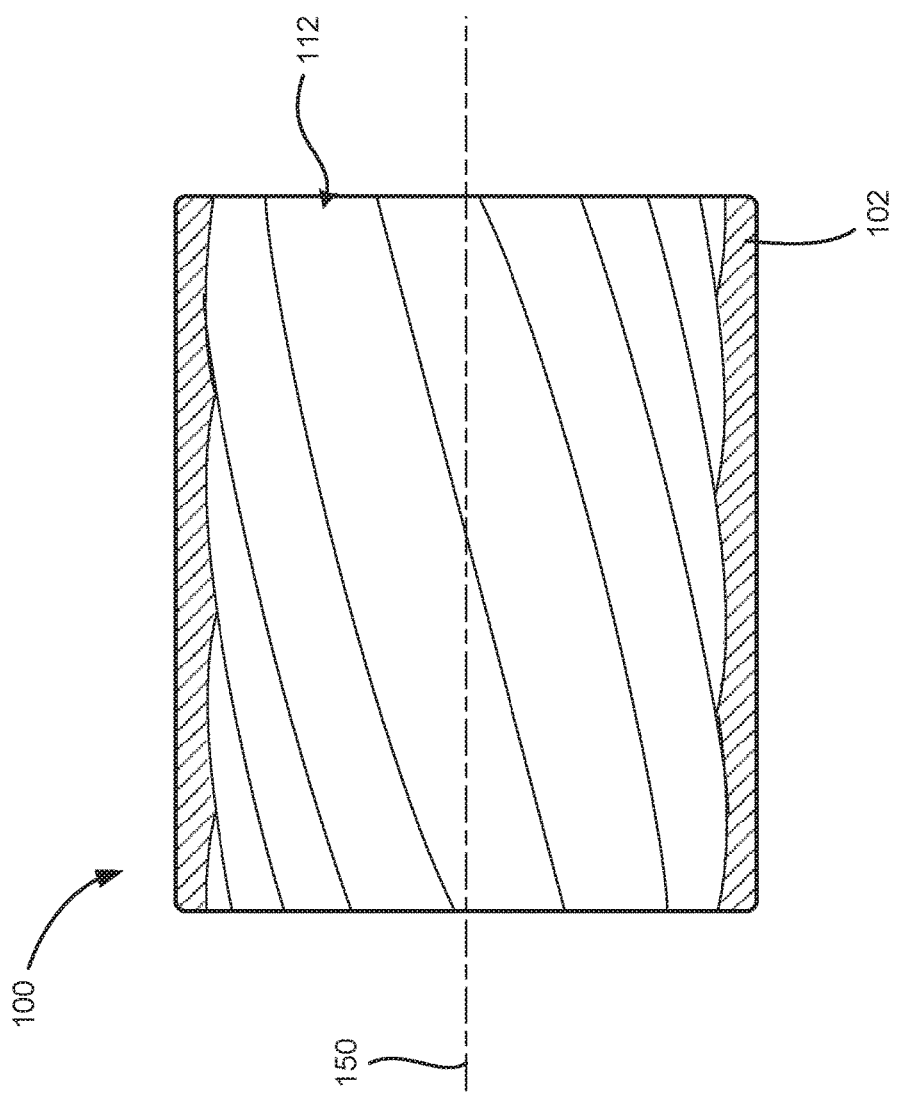

ROTOR PROFILE COMPARATOR

CROSS-REFERENCE TO RELATED APPLICATION

This application claims priority under 35 U.S.C. § 119, based on U.S. Provisional Patent Application No. 62/404,911 filed Oct. 6, 2016, the disclosure of which is hereby incorporated by reference herein.

BACKGROUND OF THE INVENTION

The present invention relates to verifying the profile of a rotor.

In the oil and natural gas drilling industry, for example, progressive cavity power sections are used when drilling underground. These power sections include metal drive shafts (or rotors). The rotors are housed in a stator having an interior diameter that is coated in threaded rubber. The rotor comprises an "internal gear" and a stator forms an "external gear" of the power section. The stator provides a cavity for fluid displacement along the rotor surface as the rotor rotates within the stator.

When serviced, the rotors are re-coated on the outer surface. If the applied coating is too thick it will wear down the rubber inside of the stator or cause excessive interference. If the applied coating is too thin, the rotor could vibrate within the stator and cause motor damage or could allow excessive fluid leakage leading to inefficient performance.

BRIEF DESCRIPTION OF THE DRAWINGS

FIG. 4 is a simplified end view of the comparator of FIG. 1;

FIG. 5 is a side view of the comparator of FIG. 1;

FIG. 6 is a side cross-sectional view of the comparator of FIG. 1;

DETAILED DESCRIPTION OF THE PREFERRED EMBODIMENTS

The following detailed description refers to the accompanying drawings. The same reference numbers in different drawings may identify the same or similar elements.

According to implementations described herein, a rotor comparator is provided. The rotor comparator has a threaded interior that matches the profile of a properly coated rotor (e.g., the original equipment manufacturer (OEM) specifications or factory specifications for the rotor). Refurbished rotors for positive displacement power sections are typically checked on the major diameter and sometimes the minor diameter. These dimensions do not account for the complete profile of the rotor. According to implementations described herein, the rotor comparator permits mechanical and visual check of at least three thickness diameters along the length of the rotor, including the major (outer) diameter of the threads, minor (depression) diameter of the threads and the tip diameters. In other implementations, the rotor comparator may also be used to verify a consistent lead (or helix angle) of the rotor along the length of the rotor. The comparator may be screwed onto the end of the rotor and slid along the length of the rotor.

For a successful rotor inspection using the comparator, the comparator will slide onto the rotor by hand, will have nominal movement side to side, and will slide over the entire profile length of the rotor without interference, e.g., catching, snagging, or binding. Additionally, for a compliant rotor, any gaps between the comparator and rotor should be minimal and the gaps should be equal on each lobe. Confirming an accurate rotor profile will ensure a proper interference fit between the rotor and stator and can decrease in-service failures due to inconsistent rotor geometry from re-coating or other refurbishment processes.

Figure 1:
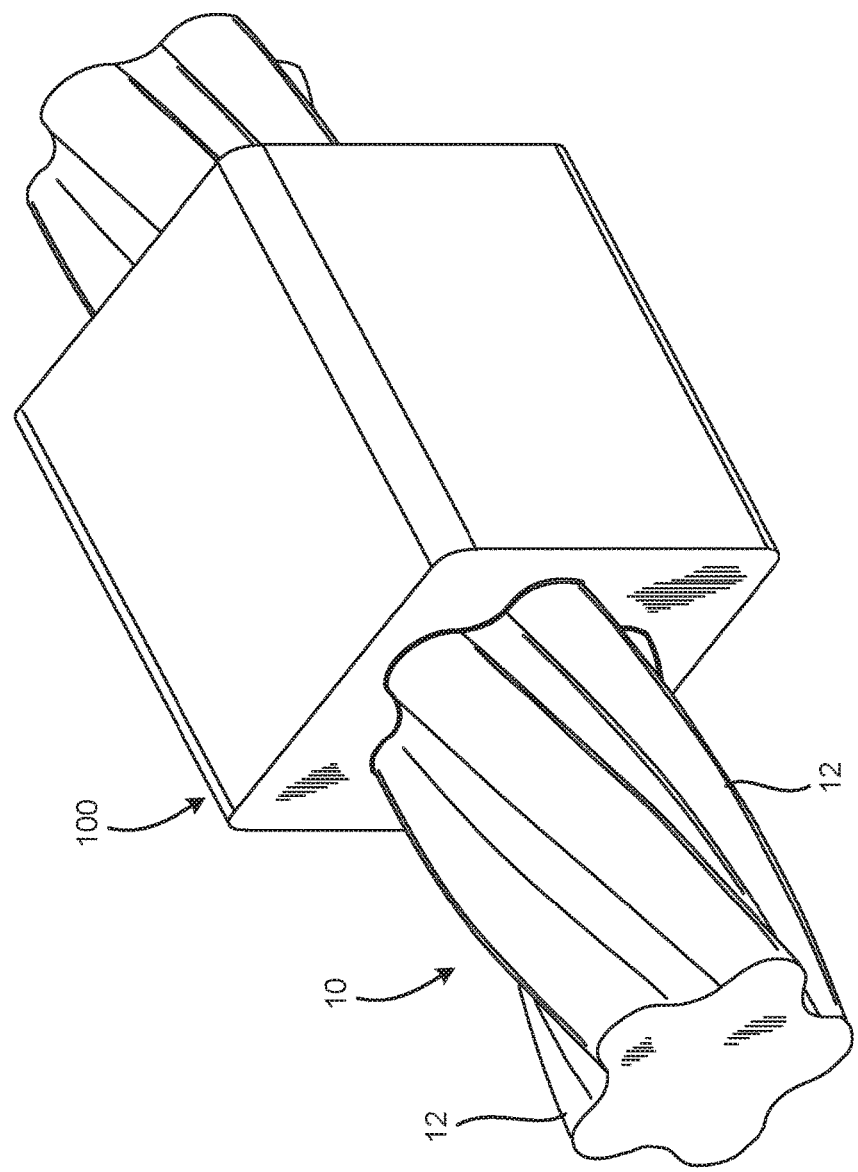
FIG. 1 is a schematic perspective diagram illustrating a comparator, applied over a portion of a rotor, according to an implementation described herein.
Figure 2:
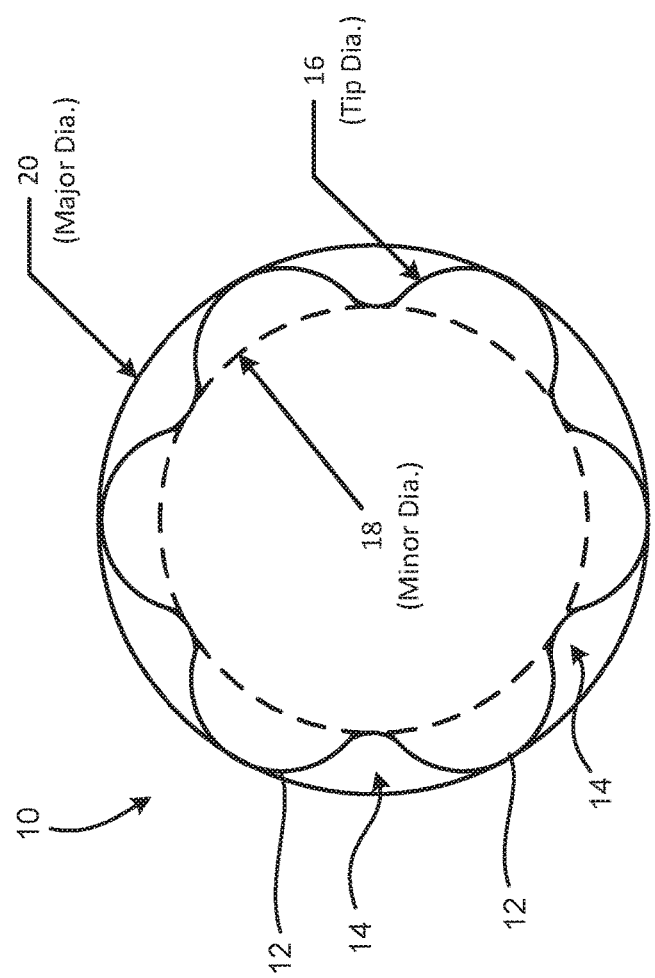
FIG. 2 is a simplified end view of the rotor of FIG. 1.

FIG. 1 is a schematic perspective diagram illustrating a comparator 100, applied over a portion of a rotor 10, according to an implementation described herein. FIG. 2 is a simplified cross-sectional view of rotor 10. As shown in FIGS. 1 and 2, rotor 10 may include multiple lobes 12 extending along a length of rotor 10 in a threaded or helical pattern. Rotor 10 may include, for example, as few as one or as many as ten or more lobes 12. Lobes 12 may be spaced about a circumference of a minor diameter so as to provide intervening grooves 14 between each lobe 12. Each lobe 12 may have a tip diameter 16. The bottom of the grooves 14 may define a minor diameter 18 for rotor 10, and the radial extension of the lobes 12 may define a major diameter 20. Rotor 10 is typically made of metal and provided with a smooth coated surface, such as a chrome surface. Repair or refurbishment of rotor 10 typically requires re-coating the outside surface of rotor 10, which can affect the actual rotor profile, including tip diameter 16, minor diameter 18, and major diameter 20. In some cases, heat treatment or other metalworking procedures applied to rotor 10 after initial delivery of the rotor may also affect the rotor profile, such as altering the lead of rotor 10 at one or more sections.

Premature failure of a stator, rotor, or other motor components may occur if the actual rotor profile does not match the OEM rotor profile. While sophisticated optical measurements may be used to verify the actual rotor profile in a factory setting, field checks (e.g., at a well site or customer location) require less expensive and more accessible tools, such as comparator 100 described further herein.

Figure 3:
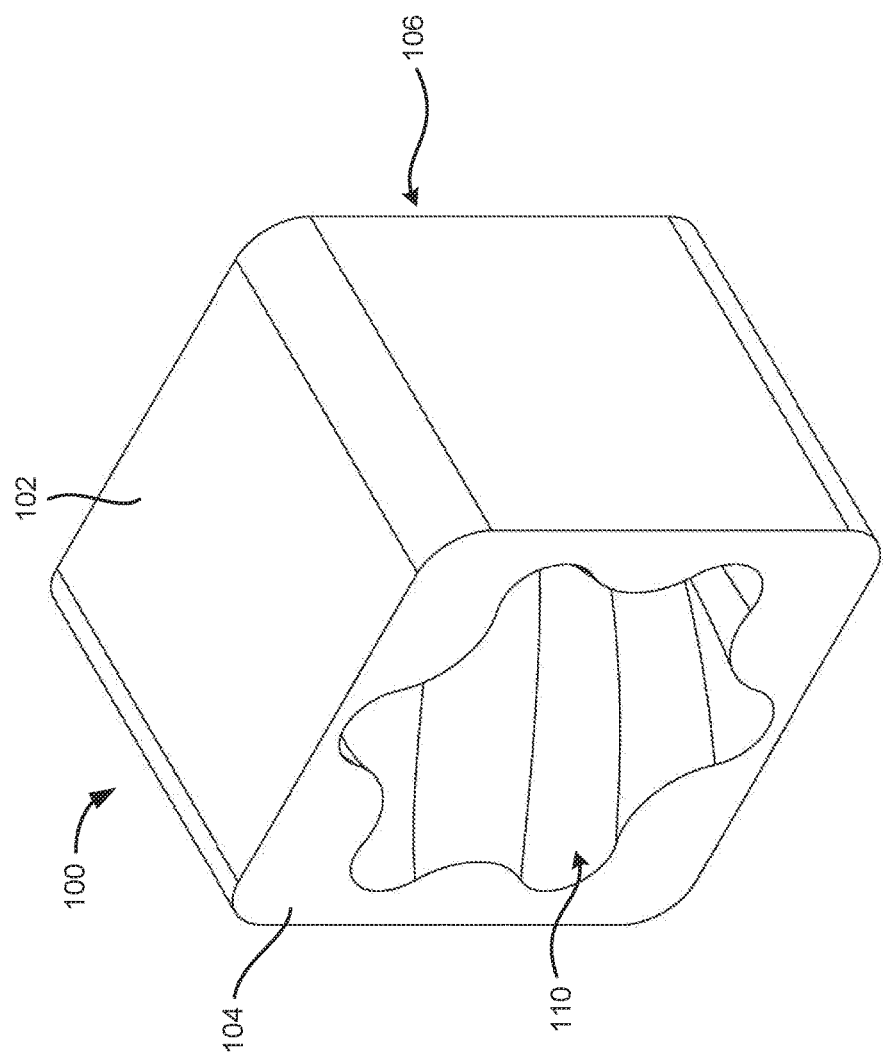
FIG. 3 is a perspective side view of the comparator of FIG. 1.

FIG. 3 is a perspective side view of comparator 100, according to an implementation. FIG. 4 is a simplified end view (e.g., with spiral groove pattern not shown), and FIG. 5 is side view, of comparator 100 according to another implementation. In the example of FIG. 3, comparator 100 is configured for a seven-lobe helical rotor. In the examples of FIGS. 4 and 5, comparator 100 is configured for a six-lobe helical rotor. FIG. 6 is a side cross-sectional view of comparator 100 along section A-A of FIG. 5. Referring collectively to FIGS. 1-6, comparator 100 may include a housing 102 with a first end 104 and a second end 106. Housing 102 may include four sides 108 of equal length to generally define a square along an end view (FIG. 4) of comparator 100. In other words, housing 102 may have a substantially square cross-section orthogonal to a primary axis 150 of internal bore 110. In one implementation, as shown, the square may have rounded corners to, for example, reduce the overall rotation circumference of comparator 100. In other implementations, housing 102 may include a non-square cross-section, such as hexagonal, circular, oval, or any other symmetric or asymmetric external cross-sectional shape. Housing 102 includes an internal bore 110 extending from along the length of housing 102 from end 104 to end 106.

Bore 110 may include helical grooves 112 that conform to the OEM profile of rotor 10. Thus, a separate comparator 100 is used for each type of rotor profile. Bore 110 may have an inner diameter 118 with nominal clearance (e.g., 0.001 to 0.005 inches) for receiving the OEM minor diameter 18 of rotor 10. Bore 110 may have an outer diameter 120 with nominal clearance for receiving the OEM major diameter 20. Bore 110 may also include multiple helical grooves 112 corresponding to a number of lobes 12 in rotor 10. Similar to inner diameter 118 and outer diameter 120, each of helical grooves 112 have a groove diameter 116 with nominal clearance for receiving lobes with an OEM tip diameter 16 of rotor 10. Each of the helical grooves 112 may also have a lead (or helix angle) that corresponds to the lead of rotor 10.

Figure 7A:
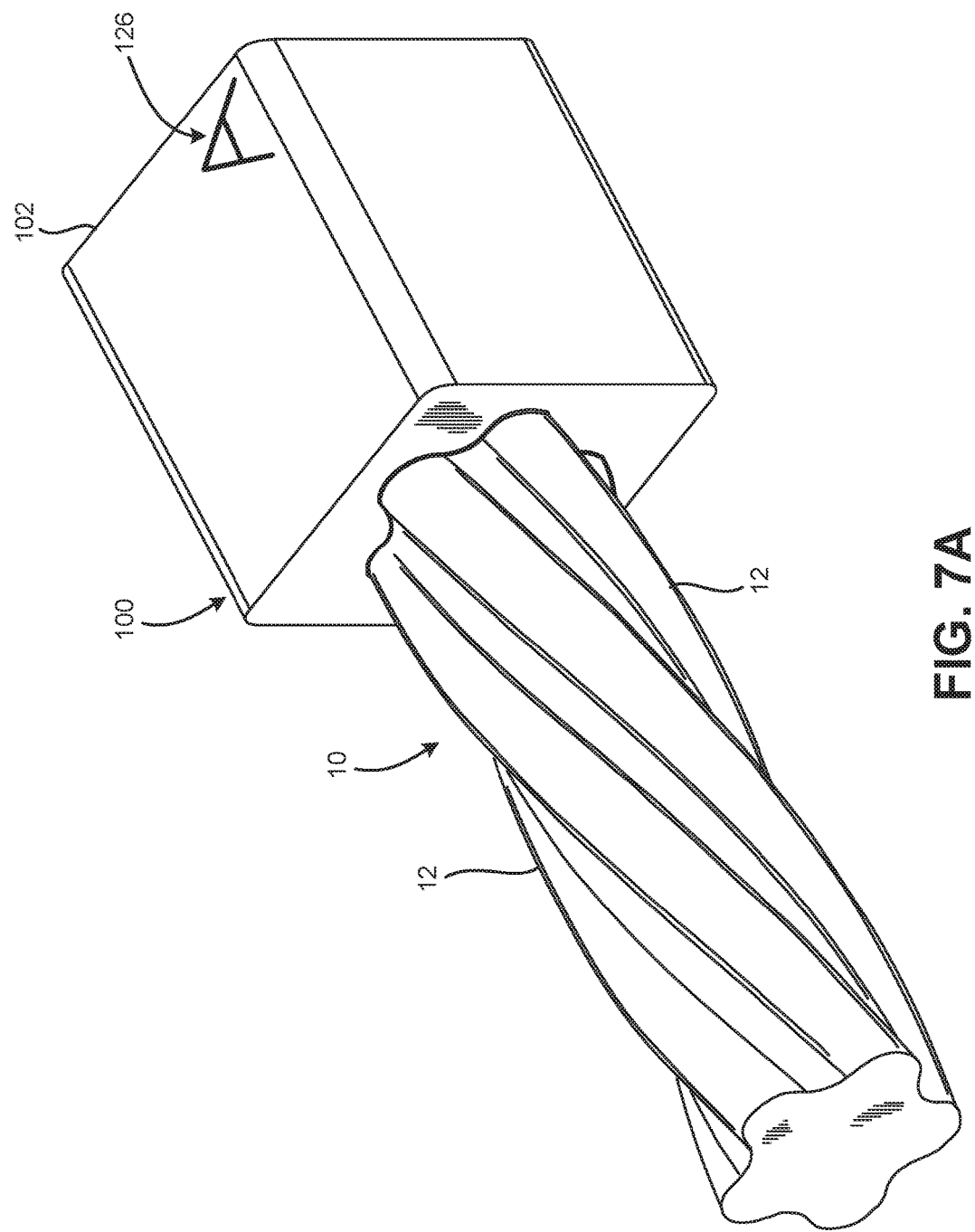
FIGS. 7A and 7B are perspective views illustrating spiral rotation of the comparator over a portion of the rotor.
Figure 7B:
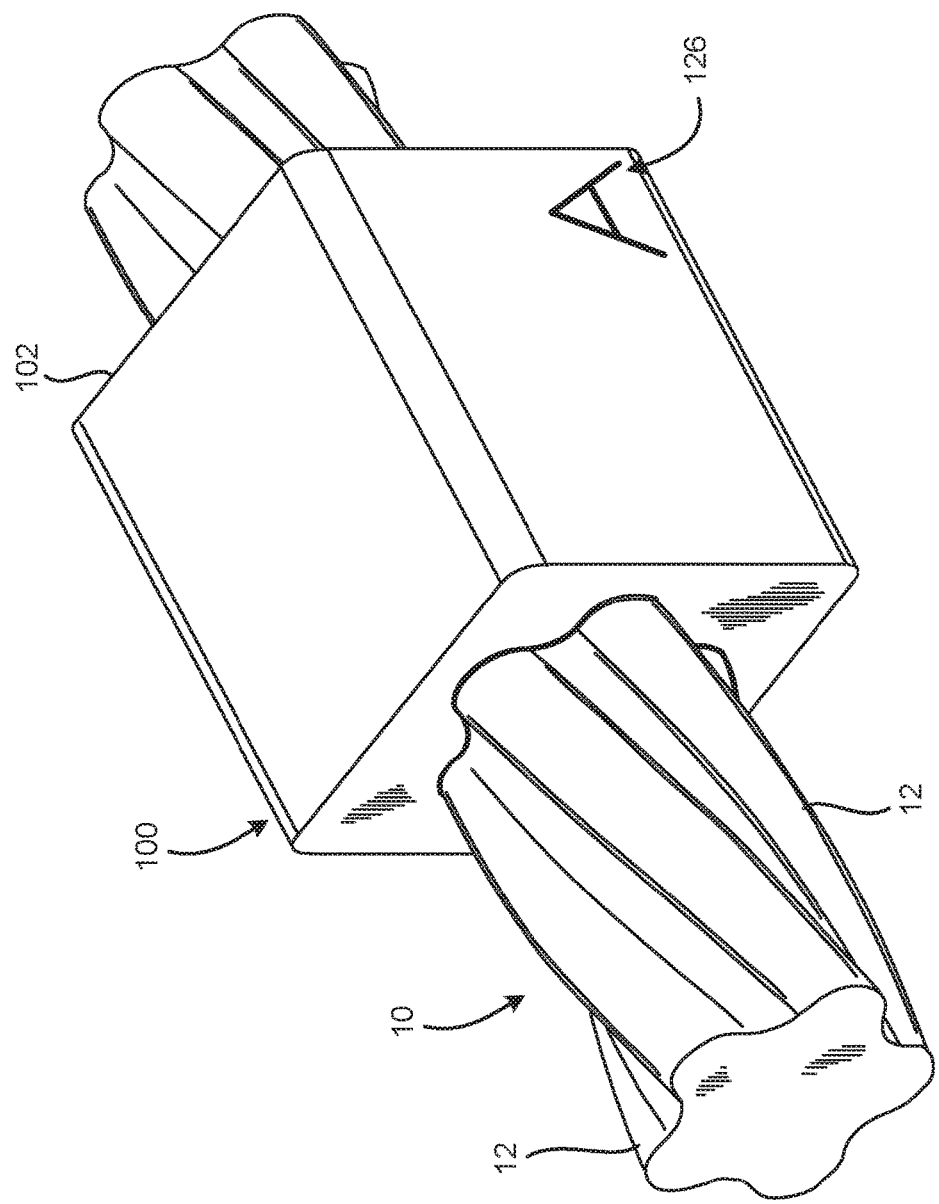

Bore 110 may have an axial length to provide a three-dimensional comparison with a portion of the profile of rotor 10. Comparator 100 may be slid onto an end of rotor 10 to verify the profile of rotor 10 in three dimensions. In one implementation, housing 102 and bore 110 may have an axial length sufficient for comparator 100 to engage any point on rotor 10 for at least a quarter turn (e.g., 90 degree rotation) of housing 102 as comparator 100 slides in a spiral path over rotor 10. For example, as shown in FIGS. 7A and 7B, comparator 100 may rotate around rotor 10 as comparator 100 is manually pushed along an axial length of rotor 10. In one implementation, the axial length of bore 110 (and corresponding housing 102) may be approximately 4 to 18 inches. In other implementations, bore 110 could be shorter than 4 inches or longer than 18 inches.

Comparator 100 may be made of a material that is comparably softer than the coated surface of rotor 10 and causes limited friction between the surface of bore 110 and the profile surface of rotor 10. Particularly, the material of comparator 100 may be selected to avoid damage to the surface of rotor 10 if comparator 100 is forced onto a portion of rotor 10 (e.g., a portion that exceeds an OEM dimension for tip diameter 16, minor diameter 18, or major diameter 20). In one implementation, housing 102 of comparator 100 may be configured to undergo catastrophic failure (e.g., crack, split, etc.) when comparator 100 is forced over a portion of rotor 10 that exceeds one or more OEM diameter (e.g., for tip diameter 16, minor diameter 18, or major diameter 20). In one implementation, comparator 100 may be made from a relatively rigid plastic material, such as Acrylonitrile Butadiene Styrene (ABS), Polylactic Acid (PLA), Polyvinyl Alcohol (PVA), Polycarbonate, or High Density Poly Ethylene (HDPE). In other implementations, comparator 100 may be formed from a comparatively soft metal (e.g., relative to the coating material of rotor 10), such as aluminum or brass. Comparator 100 may be formed, for example, using three-dimensional (3D) printing or molding techniques. In other implementations, comparator 100 may be formed using mechanical machining, chemical machining, casting and/or sintering.

As shown in FIG. 4, the square shape of housing 102 may provide contact areas 122 at each corner of end 104 (and similarly end 106, not shown). Contact areas 122 may provide a location for application of manual force to push comparator 100 along rotor 10. Contact areas 122 may provide a surface upon which force can be easily applied parallel to primary axis 150 of internal bore 110. For example, a push from a hand or tap from a mallet may be applied at one or more of contact areas 122. In contrast with contact areas 122, support areas 124 may include relatively less material to permit designed failure, as described above. Thus, each side wall 108 has varying thickness, along the length of each groove 112, between bore 110 and an outside surface of side wall 108.

As comparator 100 rotates along rotor 10, a user may visually inspect the interface of housing 102 and the circumference of rotor 10 at end 104 (or end 106). For example, comparator 100 may be positioned at any point along rotor to permit a visual inspection of the interface. In one implementation, comparator 100 may also include one or more indicators 126 on sides 108 of housing 102. As described further herein, indicators 126 may allow a user to monitor a relative position of comparator 100 as comparator 100 rotates along rotor 10.

Figure 8B:
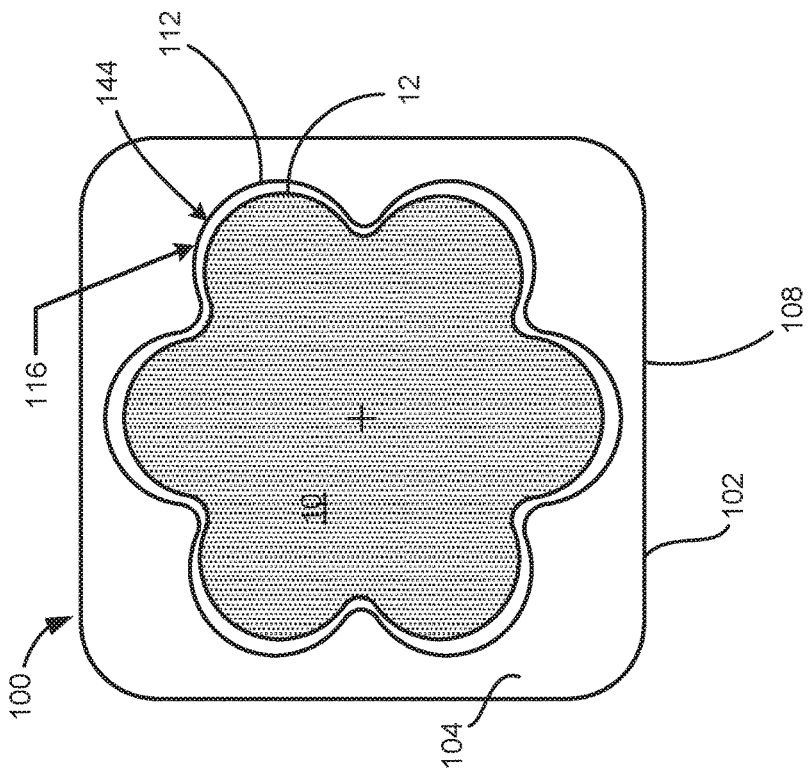
FIGS. 8A-8C are simplified end cross-sectional views of the rotor within the comparator, according to different implementations.
Figure 8A:
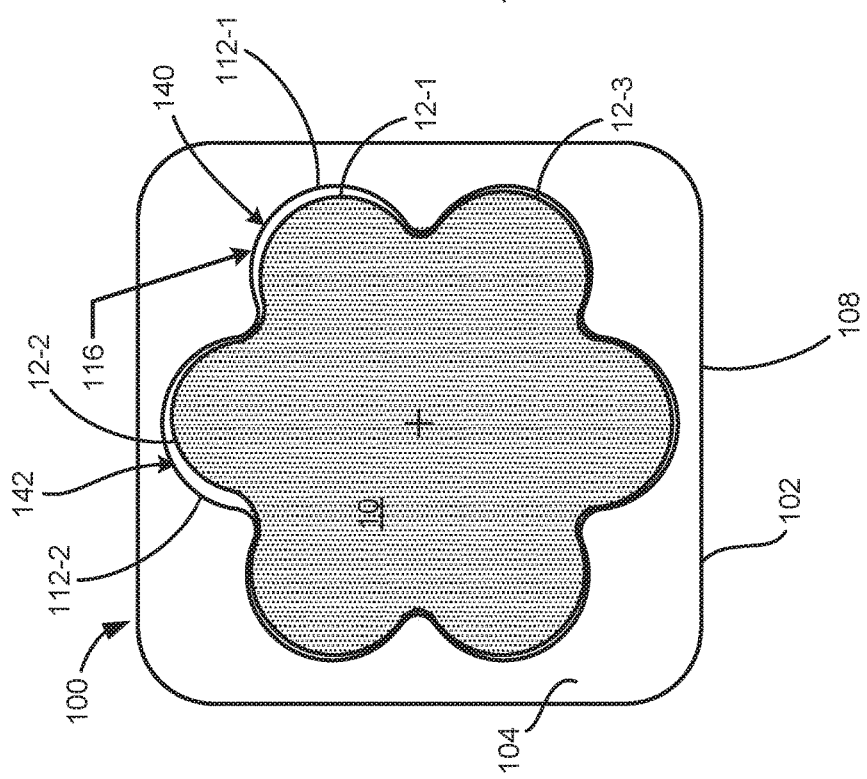
Figure 8C:
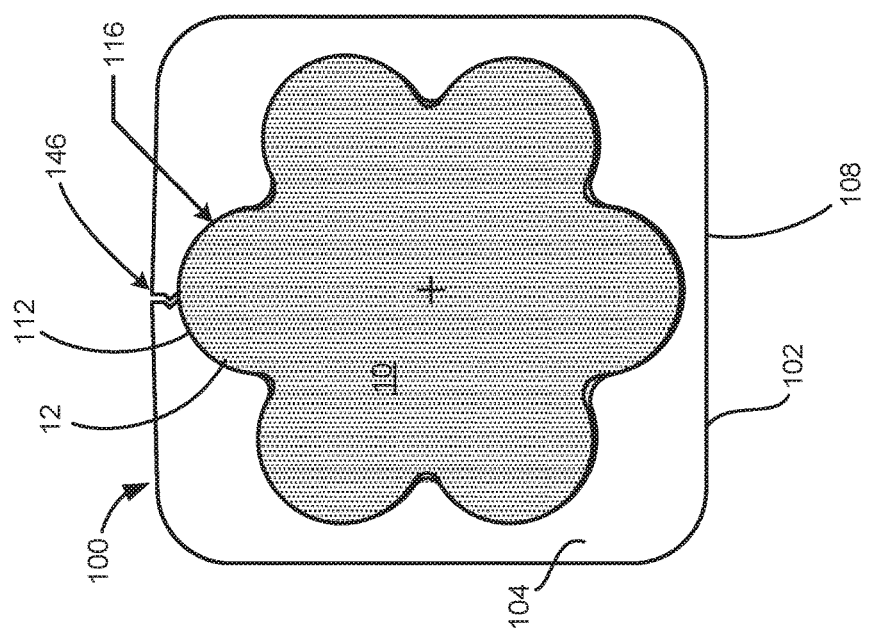

FIGS. 8A-8C show simplified end cross-sectional views of rotor 10 within comparator 100. The example of FIG. 8A illustrates a rotor 10 with two under-sized coated lobes 12-1 and 12-2. The interface of lobe 12-1 and groove 112-1 shows that the tip diameter of lobe 12-1 is smaller than the groove diameter 116, leaving a gap 140 at the interface of housing 102 and lobe 12-1 at end 104. Gap 140 may appear visibly larger than, for example, a gap at the interface of housing 102 and another lobe 12-3 with correct OEM diameters. The interface of lobe 12-2 and groove 112-2 shows that the tip diameter of lobe 12-2 is either smaller than the groove diameter 116 or unevenly applied to one of the flanks of lobe 12-2, leaving an uneven gap 142 at the interface of housing 102 and lobe 12-2 at end 104. Visual detection of gap 140 and/or gap 142 at any point along the axial length of rotor 10 may indicate an inconsistent rotor profile.

The example of FIG. 8B illustrates a rotor 10 with small outside diameter at the interface of housing 102 (at end 104) and rotor 10. While a gap 144 may be relatively consistent along circumference of rotor 10 at the particular cross-section, gap 144 may be larger than a gap at the interface of housing 102 and another section of rotor 10. In the example of FIG. 8B, if gap 144 was consistent along a length of rotor 10, comparator 100 would exhibit excessive side to side movement. Visual detection of gap 144 or side-to-side movement of comparator 100 at any point along the axial length of rotor 10 may indicate an inconsistent rotor profile.

The example of FIG. 8C illustrates a rotor 10 with an oversized diameter at the interface of housing 102 (at end 104) and rotor 10. The interface of lobe 12 and groove 112 in FIG. 8C shows that the tip diameter of lobe 12 is larger than groove diameter 116. The larger tip diameter prevents sliding/rotation of comparator 100 past the oversized portion of rotor 10 at lobe 12. If substantial force is applied to comparator 100 (e.g., at contact area 122 on second end 106) to push comparator 100 over the oversized area, housing 102 may fail, such as shown at crack 146 at the interface of housing 102 and lobe 12 at end 104.

In another implementation, comparator 100 may be used to verify the lead (e.g., helix angle of lobes 12) on rotor 10. For example, rotor 10 may undergo a heat treatment operation that could lead to stress relieving within rotor 10. The stress relieving may alter (e.g., lengthen or shorten) the lead of rotor 10 at one or more sections along the length of rotor 10. In one implementation, comparator 100 may be slid over rotor 10 before the heat treatment of the rotor (e.g., to verify the rotor lead) and then again after the heat treatment. If the lead of rotor 10 is altered by the heat treatment, comparator 100 may be used to indicate these changes to the lead of rotor 10. For example, similar to the illustrations of FIG. 8A-8C, comparator 100 may slide differently than before the heat treatment, show gaps at the comparator-rotor interface, have side-to-side movement, become jammed, or crack when slid over rotor 10 after heat treatment of rotor 10. Any of these indications may signal a post-treatment change to the profile of rotor 10.

Figure 9:
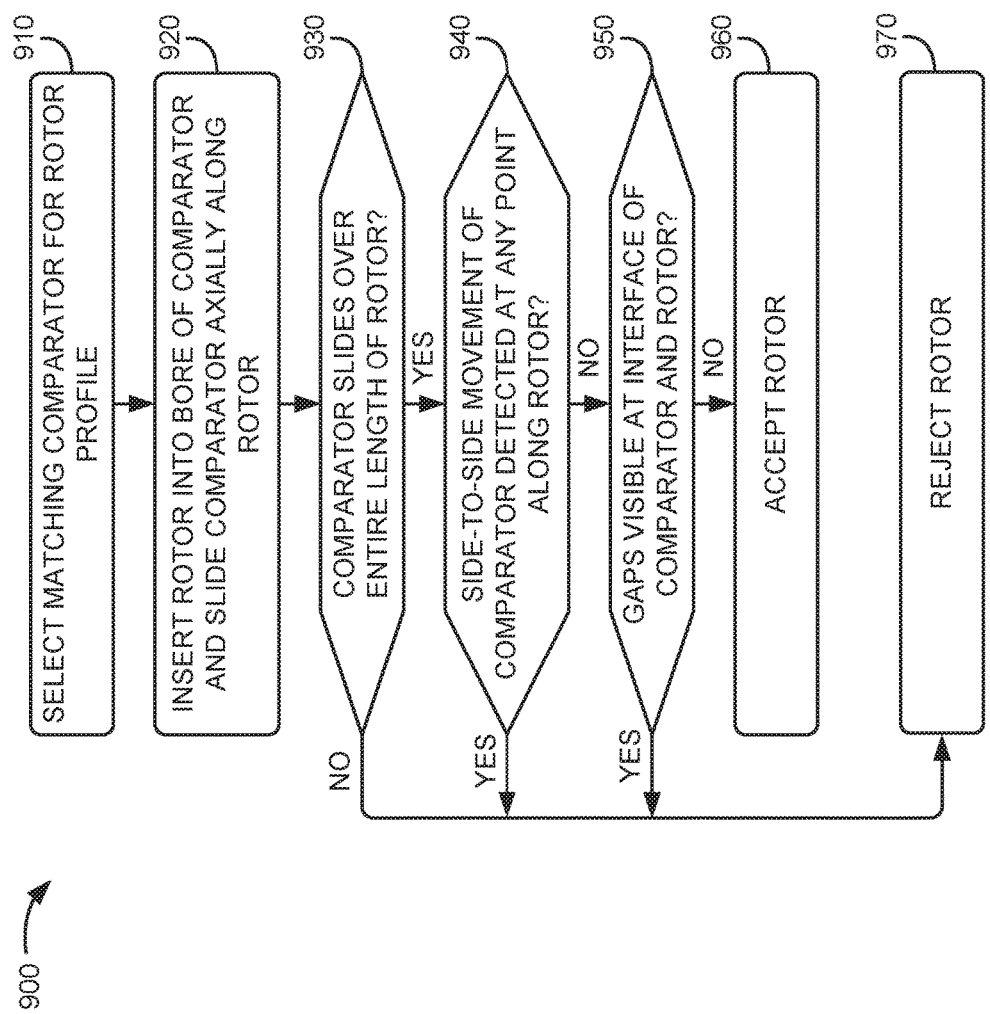
FIG. 9 is a flow diagram of a process for testing the profile of a rotor according to an implementation described herein.

FIG. 9 is a flow diagram of a process 900 for inspecting a rotor using a comparator, according to an implementation described herein. Process 900 may include selecting a matching comparator for a particular rotor profile (block 910). For example, a user may select comparator 100 with a matching OEM profile for a multi-lobe rotor 10. The matching comparator 100 may include a bore 110 with the same number of grooves 112 as lobes 12 in rotor 10, an inner diameter 118 with nominal clearance for receiving the OEM minor diameter 18 of rotor 10, an outer diameter 120 with nominal clearance for receiving the OEM major diameter 20, and a groove diameter 116 with nominal clearance for receiving lobes with an OEM tip diameter 16 of rotor 10.

Process 900 may also include inserting the rotor into a bore of the comparator and sliding the comparator axially along the rotor (block 920). For example, comparator 100 may be inserted onto rotor 10. In some cases, the tail of the rotor may be oversized, making it difficult to fit comparator 100 over the start of the rotor profile. In such a case, a rubber hammer or hard push may be applied at one of contact areas 122 to tap comparator 100 over the tail of rotor 10.

Process 900 may further include determining if the comparator slides over the entire length of the rotor (block 930). For example, comparator may slide in a spiral motion along the length of the rotor if each of the rotors' tip diameter 16, minor diameter 18, major diameter 20 not nominally larger than OEM specifications.

If the comparator slides over the entire length of the rotor (block 930-YES), it may be determined if there is side-to-side movement of the comparator at any point along the rotor (block 940). For example, comparator 100 may exhibit a loose fit or wobbling as it spins over rotor 10. In one implementation, comparator may be spot checked at multiple locations along the length of rotor 10 for side-to-side movement.

If there is no side-to-side movement of the comparator (block 940-NO), it may be determined if there are visible gaps at the interface of the comparator and the rotor at any point along the length of the rotor (block 950). For example, the interface of comparator 100 (e.g., at either end 140 or end 106) and rotor 10 may be inspected for gaps, such as gaps 140, 142, or 144 described in connection with FIGS. 8A and 8B.

If there are no visible gaps at the interface of the comparator and the rotor (block 950-NO), the rotor may be accepted for service (block 960).

If the comparator does not slide over the entire length of the rotor (block 930-NO), if there is side-to-side movement of the comparator (block 940-YES), or if there are visible gaps at the interface of the comparator and the rotor (block 950-YES), then the rotor may be rejected for service (block 970). For example, if comparator 100 continues to stay tight on the rotor profile after the entire length of the comparator has gone over a portion of rotor 10, rotor 10 may be rejected. In one implementation, a nominally larger comparator 100 (e.g., with larger tolerances) may be used to determine if an inconsistent rotor profile is within a predetermined limit beyond OEM specifications (e.g., a 0.005 inch larger outside diameter). If excessive side-to-side movement or large gaps are seen between rotor 10 and comparator 100, or if inconsistent gaps are seen from one side of a lobe to another, then rotor 10 may also be rejected. The rejected rotor 10 may be returned for further testing or refurbishment.

In implementations described herein a comparator tool is provided for evaluating the profile of a multi-lobe helical rotor. The comparator tool includes a housing with a first end and a second end and an internal bore extending from the first end to the second end. The internal bore includes a first diameter having nominal clearance for an OEM-specified major diameter of the rotor, a second diameter having nominal clearance for an OEM-specified minor diameter of the rotor, and multiple helical grooves corresponding to a number of lobes in the multi-lobe helical rotor. Each of the multiple helical grooves has nominal clearance for an OEM-specified tip diameter of the rotor. The comparator tool slides along the length of the rotor and provides visibility of an interface between a circumference of the rotor and the first end at any place along a length of the rotor.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above-mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A comparator tool for evaluating a profile of a multi-lobe helical rotor, the comparator tool comprising:
   a housing comprising a first end and a second end, the housing including an internal bore extending from the first end to the second end,
   the internal bore including:
      a first diameter having nominal clearance for a factory-specified major diameter of the rotor,
      a second diameter having nominal clearance for a factory-specified minor diameter of the rotor, and
      multiple helical grooves corresponding to a number of lobes in the multi-lobe helical rotor, wherein each of the multiple helical grooves have nominal clearance for a factory-specified tip diameter of the rotor,
   wherein the comparator tool provides visibility of an interface between a circumference of the rotor and the first end at any place along a length of the rotor.

2. The comparator tool of claim 1, wherein the housing comprises a substantially square cross-section orthogonal to a primary axis of the internal bore.

3. The comparator tool of claim 1, wherein the housing is formed from a plastic material.

4. The comparator tool of claim 1, wherein the housing is configured to break when forced over a rotor profile with any of:
   a major diameter that is larger than the first diameter, a minor diameter that is larger than the second diameter,
a tip diameter that is larger than one of the multiple helical grooves, or
a rotor lead that is different than a corresponding helix angle of the multiple helical grooves.

5. The comparator tool of claim 1, wherein the housing is configured to slide in a spiral path along the rotor when a major diameter of the rotor, a minor diameter of the rotor, and tip diameters of each of the multiple lobes of the rotor are not larger than the respective factory-specified major diameter, factory-specified minor diameter, and factory-specified tip diameter.

6. The comparator tool of claim 1, wherein the first end and the second end include a contact surface upon which force can be applied parallel to a primary axis of the internal bore.

7. The comparator tool of claim 1, the housing further comprising a side wall, wherein the side wall has varying thickness, along the length of each groove, between the internal bore and an outside surface.

8. The comparator tool of claim 1, wherein the housing is configured to show gaps, at the interface between a circumference of the rotor and the first end, when a tip diameter of one of the multiple lobes of the rotor is smaller than the factory-specified tip diameter.

9. The comparator tool of claim 1, wherein the comparator is molded, mechanically machined, chemically machined, cast, or sintered.

10. The comparator tool of claim 1, wherein the comparator is formed using a three-dimensional printing process.

11. The comparator tool of claim 1, wherein the housing has an axial length, along a primary axis of the internal bore, of at least four inches and up to eighteen inches.

12. The comparator tool of claim 1, wherein the housing comprises a cross-section, orthogonal to a primary axis of the internal bore, the cross-section forming:
a contact surface on the first end and the second end upon which force can be applied parallel to the primary axis of the internal bore, and
a support surface on the first end and the second end to permit a designed failure of the housing.

13. A method for evaluating a profile of a multi-lobe helical rotor, the method comprising:
selecting a matching comparator for the profile of the rotor, wherein the comparator includes:
a housing comprising a first end and a second end, the housing including an internal bore extending from the first end to the second end, and
the internal bore including a first diameter having nominal clearance for a factory-specified major diameter of the rotor, a second diameter having nominal clearance for a factory-specified minor diameter of the rotor, and multiple helical grooves corresponding to a number of lobes in the multi-lobe helical rotor, wherein each of the multiple helical grooves have nominal clearance for a factory-specified tip diameter of the rotor;
inserting the rotor into the bore;
attempting to slide the comparator over a length of the rotor; and
if the comparator slides over the length of the rotor, visually inspecting for:
side-to-side movement of the comparator while on the rotor, and
gaps at an interface of the comparator and the rotor along the length of the rotor.

14. The method of claim 13, wherein attempting to slide the comparator over a length of the rotor comprises:
sliding the comparator in a spiral path along the rotor when a major diameter of the rotor, a minor diameter of the rotor, and a tip diameter of each of multiple lobes of the rotor are not larger than the respective factory-specified major diameter, factory-specified minor diameter, and factory-specified tip diameter.

15. The method of claim 13, wherein attempting to slide the comparator over a length of the rotor comprises:
applying force, in a direction parallel to a primary axis of the internal bore, to a contact surface on a first end of the housing.

16. A comparator tool for evaluating a profile of a multi-lobe helical rotor, the comparator tool comprising:
a housing comprising a first end and a second end, the housing including an internal bore extending from the first end to the second end,
the internal bore including:
a first diameter having nominal clearance for a factory-specified major diameter of the rotor,
a second diameter having nominal clearance for a factory-specified minor diameter of the rotor, and
multiple helical grooves corresponding to a number of lobes in the multi-lobe helical rotor, wherein each of the multiple helical grooves have nominal clearance for a factory-specified tip diameter of the rotor,
wherein the housing is configured to slide in a spiral path along the rotor when a major diameter of the rotor, a minor diameter of the rotor, and tip diameters of each of the multiple lobes of the rotor are not larger than the respective factory-specified major diameter, factory-specified minor diameter, and factory-specified tip diameter, and
wherein the comparator tool provides visibility of an interface between a circumference of the rotor and the housing at any place along a length of the rotor.

17. The comparator tool of claim 16, wherein the housing comprises a substantially square cross-section orthogonal to a primary axis of the internal bore.

18. The comparator tool of claim 17, the housing further comprising a side wall, wherein the side wall has varying thickness, along the length of each groove, between the internal bore and an outside surface.

19. The comparator tool of claim 16, wherein the housing is configured to show gaps, at the interface between a circumference of the rotor and the first end, when a tip diameter of one of the multiple lobes of the rotor is smaller than the factory-specified tip diameter.

20. The comparator tool of claim 19, wherein the housing is configured to show gaps, at the interface between a circumference of the rotor and the second end, when a tip diameter of one of the multiple lobes of the rotor is smaller than the factory-specified tip diameter.

* * * * *